(12) United States Patent
Li et al.

(10) Patent No.: US 7,053,351 B2
(45) Date of Patent: May 30, 2006

(54) NEAR-FIELD SCANNING OPTICAL MICROSCOPE FOR LASER MACHINING OF MICRO- AND NANO- STRUCTURES

(75) Inventors: Ming Li, Chelmsford, MA (US); Chen-Hsiung Cheng, Westford, MA (US)

(73) Assignee: Matsushita Electric Industrial, Co., LTD, Osaka (JP)

( * ) Notice: Subject to any disclaimer, the term of this patent is extended or adjusted under 35 U.S.C. 154(b) by 142 days.

(21) Appl. No.: 10/813,503

(22) Filed: Mar. 30, 2004

(65) Prior Publication Data
US 2005/0218315 A1    Oct. 6, 2005

(51) Int. Cl.
G02B 7/04    (2006.01)
(52) U.S. Cl. .................. 250/201.3; 250/306
(58) Field of Classification Search ............. 250/201.3, 250/306
See application file for complete search history.

(56) References Cited

U.S. PATENT DOCUMENTS 5,939,709 A * 8/1999 Ghislain et al. ............ 250/216

FOREIGN PATENT DOCUMENTS

| EP | 0871166 | 10/1998 |
|----|---------|---------|
| JP | 11-16856 | 1/1999 |
| JP | 2001-111200 A | 4/2001 |
| JP | 2001-239390 A | 9/2001 |
| JP | 2001239390 | 9/2001 |

OTHER PUBLICATIONS

A. Chimmalgi et al., Femtosecond laser aperturless near-field nanomaching of metals assisted by scanning probe microscopy, Applied Physics Letters, Feb. 24, 2003, pp. 1146-1148, vol. 82, No. 8.

K. Lieberman et al., Near-field optical photomask repair with a femtosecond laser, Journal of Microscopy, May/Jun. 1999, pp. 537-541, vol. 194, Pt 2/3.

Int'l Search Report for PCT/US2005/010493.

* cited by examiner

*Primary Examiner*—Que T. Le
*Assistant Examiner*—Pascal M. Bui-Pho
(74) *Attorney, Agent, or Firm*—RatnerPrestia

(57) ABSTRACT

A near-field scanning optical microscope (NSOM) laser micromachining system for laser machining features on surfaces using an ultrafast laser source and a method of laser machining such features. The system includes: the ultrafast laser source to generate pulses of laser light having pulse durations less than 1 ns and a peak wavelength; an NSOM probe having a substantially cylindrical shape; an NSOM mount to controllably hold the NSOM probe and the microstructure workpiece to be machined; an NSOM probe monitor coupled to the NSOM mount for determining the distance between the probe tip of the NSOM probe and the surface; and an NSOM controller coupled to the NSOM probe monitor, and motion stages in the NSOM mount. The NSOM mount includes an XY motion stage and a Z motion stage. These motion stages are couple to either the NSOM probe or the microstructure workpiece, or one motion stage to each.

29 Claims, 5 Drawing Sheets

NEAR-FIELD SCANNING OPTICAL MICROSCOPE FOR LASER MACHINING OF MICRO- AND NANO- STRUCTURES

FIELD OF THE INVENTION

The present invention concerns an apparatus and method for laser machining of submicron features on microstructures, including nanostructures, using a near-field scanning optical microscope (NSOM). This method may also allow mass customization or repair of generic electronic and mechanical microstructures.

BACKGROUND OF THE INVENTION

As products get smaller and smaller, there is increased demand for micro-electrical-mechanical systems (MEMS), micro-optical devices and photonic crystals. With this demand, there is an associated increased interest in micro- and nano- machining. Numerous applications exist for MEMS. As a breakthrough technology, allowing unparalleled synergy between previously unrelated fields such as biology and microelectronics, new MEMS applications are emerging at a rapid pace, expanding beyond those currently identified or known. Additional applications in quantum electric devices, micro-optical devices and photonic crystals are also emerging.

Here are a few applications of current interest:

Quantum Electrical Devices

Interest in ideas such as quantum computing have led to the development of devices requiring increasing smaller dimensions, such as cellular automata and coupled quantum dot technologies. Resonant tunneling devices such as resonant tunneling diodes, which may utilize quantum effects of transmission electrons to increase the efficiency of microwave circuits, require particularly fine features.

Micro-Optics

The application of micro-machining techniques to optics has lead to numerous advances in optical fabrication such as gray scale technology. Gray scale technology allows for the creation of a wide variety of shapes allowing for the best optical performance achievable. Traditional binary optics rely on a "stair step" shaped approximation of the ideal surface shape. Gray scale can actually create that ideal shape. Curves, ramps, torroids, or any other shape is possible. Multi-function optics, microlens arrays, diffusers, beam splitters, and laser diode correctors may all benefit from the use of gray scale technology. These optical devices as well as others, including fine pitch gratings for shorter and shorter wavelength light, benefit from increased precision available using micro-machining. Optical MEMS devices including beam shapers, continuous membrane deformable mirrors, moving mirrors for tunable lasers, and scanning two axis tilt mirrors have also emerged due to progress in micro-machining technology.

Photonic Crystals

Photonic crystals represent an artificial form of optical material that may be used to create optical devices with unique properties. Photonic crystals have many optical properties that are analogous to the electrical properties of semiconductor crystals and, thus, may also allow the development of optical circuitry similar to present electrical semiconductor circuitry. The feature sizes used to form photonic crystals and the precise alignment requirements of these features complicate manufacture of these materials. Improved alignment techniques and reduced minimum feature size capabilities for micro-machining systems may lead to further developments in this area.

Biotechnology

MEMS technology has enabling new discoveries in science and engineering such as: polymerase chain reaction (PCR) microsystems for DNA amplification and identification; micro-machined scanning tunneling microscope (STM) probe tips; biochips for detection of hazardous chemical and biological agents; and microsystems for high-throughput drug screening and selection.

Communications

In addition to advances that may result from the use of resonant tunneling devices, high frequency circuits may benefit considerably from the advent of RF-MEMS technology. Electrical components such as inductors and tunable capacitors made using MEMS technology may perform significantly better than their present integrated circuit counterparts. With the integration of such components, the performance of communication circuits may be improved, while the total circuit area, power consumption and cost may be reduced. In addition, a MEMS mechanical switch, as developed by several research groups, may be a key component with huge potential in various microwave circuits. The demonstrated samples of MEMS mechanical switches have quality factors much higher than anything previously available. Reliability, precise tuning, and packaging of RF-MEMS components are to be critical issues that need to be solved before they receive wider acceptance by the market.

Advances in micro-optics and the introduction of new optical devices using photonic crystals may also benefit communications technology.

Accelerometers

MEMS accelerometers are quickly replacing conventional accelerometers for crash air-bag deployment systems in automobiles. The conventional approach uses several bulky accelerometers made of discrete components mounted in the front of the car with separate electronics near the air-bag. MEMS technology has made it possible to integrate the accelerometer and electronics onto a single silicon chip at a cost of $\frac{1}{5}$ to $\frac{1}{10}$ of the cost of the conventional approach. These MEMS accelerometers are much smaller, more functional, lighter, and more reliable as well, compared to the conventional macro-scale accelerometer elements.

Micro-circuitry

Reducing the size of electronic circuits is another area in which MEMS technology may affect many fields. As the density of components and connections increases in these microcircuits, the processing tolerances decrease. One challenge in producing micro-circuitry is preventing shorts between components and nano-wires which are located ever closer together. Yields may be significantly increased by micromachining methods with the capability to repair these defects.

Micromachining of submicron features has been a domain predominated by electron-beam, ultraviolet beam, and X-ray lithographic machines, as well as focused ion beam machines. These high-cost techniques usually require stringent environmental conditions, such as high vacuum or clean room condition. All the lithographic methods require a series of complicated procedures, which involve generating multiple masks and using photoresist.

If a beam processing technique is used, this process requires the beam to be directed accurately at the desired location with a high degree of precision for proper processing. Only four currently available technologies (laser direct writing, focused ion beam writing, micro electric discharge machine, and photochemical etching) have this potential capability. Other techniques (for example ion beam milling) are only desirable for flat wafer processing. However, direct laser writing has the additional advantage of operation in ambient air. Still forming submicron features with a laser beam smaller the wavelength of the laser is a difficult issue.

Laser machining of surfaces using the near-field radiation of a near-field scanning optical microscope (NSOM), sometimes known as a scanning near-field optical microscope, has been proposed as a means of laser machining submicron features. One potential method for micromachining surfaces in this way is disclosed in Japanese Patent Application 2000-51975, LASER MACHINING APPARATUS AND ITS METHOD AND AN OPTICAL ELEMENT MACHINED BY USING SAME, to H. Owari, et al. Owari, et al. disclose using light from a short-wavelength ultraviolet laser that is transmitted through the probe of an atomic force microscope to laser machine an optical grating.

SUMMARY OF THE INVENTION

An exemplary embodiment of the present invention is a near-field scanning optical microscope (NSOM) laser micromachining system for laser machining features on surfaces using an ultrafast laser source. The system includes: the ultrafast laser source to generate pulses of laser light having pulse durations less than 1 ns and a peak wavelength; an NSOM probe having a substantially cylindrical shape; an NSOM mount to controllably hold the NSOM probe and the microstructure workpiece to be machined; an NSOM probe monitor coupled to the NSOM mount for determining the distance between the probe tip of the NSOM probe and the surface; and an NSOM controller coupled to the NSOM probe monitor, and motion stages in the NSOM mount. The NSOM probe includes: an input plane at one end; a probe tip at the other end with a cross-sectional area less than a square of the peak wavelength of the pulses of laser light; an optically transmissive core extending substantially from the input plane to the probe tip; and a radiation confinement coating formed on a section of a side surface of the NSOM probe adjacent to the probe tip. The optically transmissive core is optically coupled to the ultrafast laser source through the input plane. The NSOM mount includes an XY motion stage and a Z motion stage. These motion stages are couple to either the NSOM probe or the microstructure workpiece, or one motion stage to each. The NSOM controller controls the vertical position of either the NSOM probe or the microstructure workpiece, depending on which is coupled to the Z motion stage, based on the distance between the probe tip of the NSOM probe and the surface of the microstructure workpiece determined by the NSOM probe monitor. The NSOM controller controls the horizontal position of either the NSOM probe or the microstructure workpiece, depending on which is coupled to the XY motion stage, based on the feature to be laser machined on the surface of the microstructure workpiece.

Another exemplary embodiment of the present invention is a method for laser machining a feature on a microstructure workpiece using an ultrafast laser source and an NSOM. The microstructure workpiece is mounted in the NSOM. The distance between the probe tip of the NSOM probe and a surface of the microstructure workpiece is determined. This distance is controlled such that the distance is substantially equal to a machining distance. The ultrafast laser source is used to generate pulses of laser light having pulse durations less than 1 ns and a peak wavelength. These pulses of laser light are coupled into the NSOM probe and a near-field mode portion of the pulses of laser light is coupled through the probe tip of the NSOM probe and onto a near-field irradiated area of the surface of the microstructure workpiece, which corresponds to the location of the probe tip. The near-field mode portion of the pulses of laser light laser machines the near-field irradiated area. At least one of the NSOM probe and the microstructure workpiece are move such that the probe tip is scanned over a feature region of the surface, which corresponds to the feature. While the probe tip is being scanned, the distance between the probe tip and a surface is determined and controlled to maintain the distance between the probe tip and the surface substantially equal to the machining distance. Also, while the probe tip is being scanned, the pulses of laser light are being generated and coupled into the NSOM probe and a near-field mode portion of the pulses of laser light is being coupled through the probe tip and onto a near-field irradiated area to laser machine the feature on the surface of the microstructure workpiece.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

NSOM's use many of the same principles as atomic force microscopes (AFM's) to accurately profile surfaces. Laser micromachining of these surfaces using near-field radiation from an NSOM probe tip may provide a number of advantages compared to using non-near-field radiation and free space optics. The advantages may include precise positioning control of the NSOM probe tip and a reduced minimum feature size. The precise motion stages used in NSOM devices may be used to provide precise horizontal and vertical positioning control. Additionally, the ability of an NSOM to profile a surface allows for the accurate vertical positioning of the probe tip desired to couple significant near-field radiation to the surface.

The minimal feature size that may be machined with an exemplary NSOM laser machining system of the present invention using near-field radiation is determined by the size of the NSOM probe tip, rather than by the wavelength of the laser light used to generate the near-field radiation. This may allow a laser machining apparatus, such as that disclosed by Owari et al., to machine areas on a surface, which are smaller than the diffraction limited spot size of a free space laser beam from the same laser source. The wavelength of the laser is still an issue, though, because it affects the efficiency with which the light may be coupled into the near-field through the NSOM probe tip. Thus, Owari et al. disclose the use of short wavelength UV lasers with wavelengths approximately equal to the diameters of the circular cross-sections of their NSOM probe tips.

Figure 1:
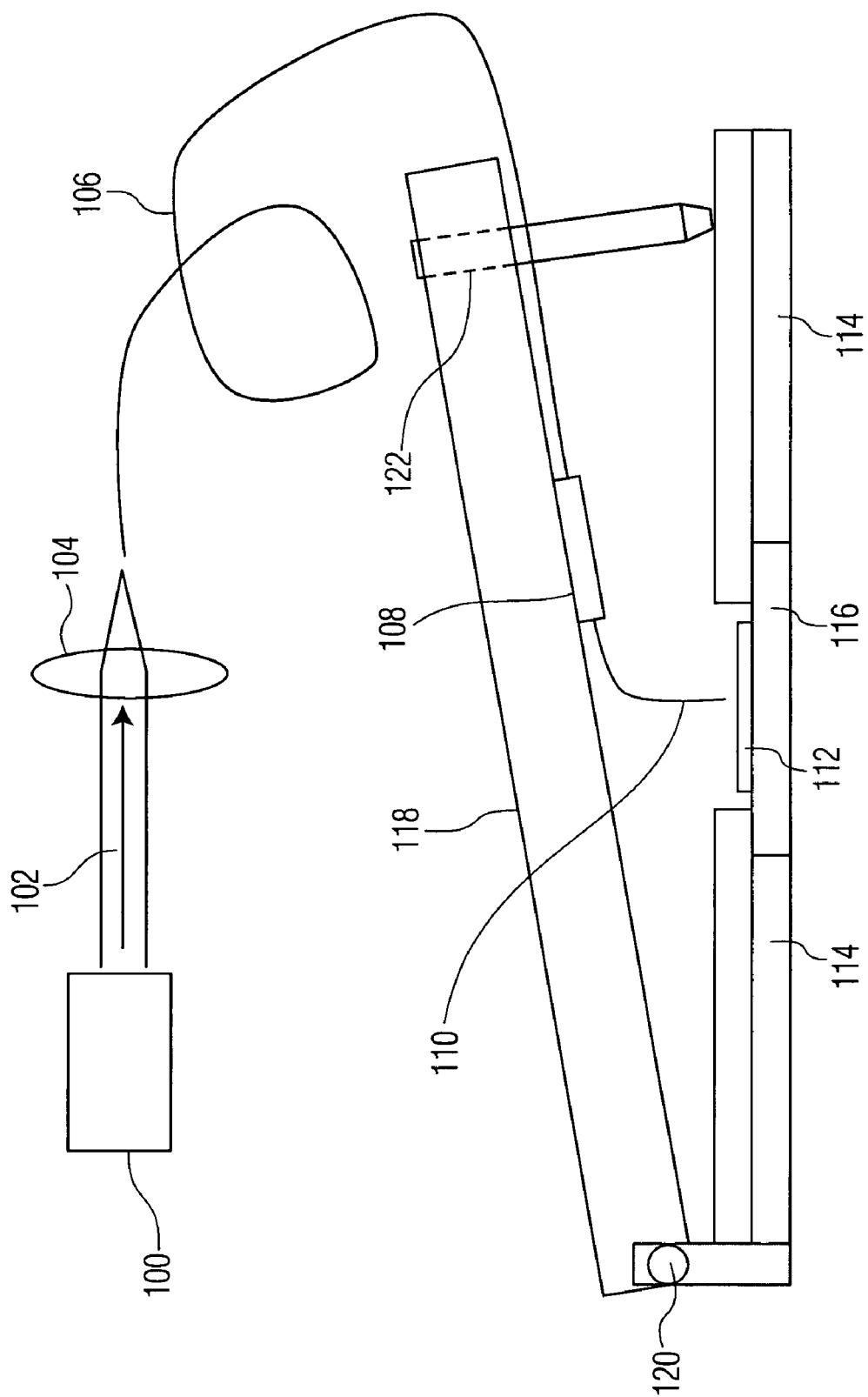
FIG. 1 is a block diagram of an exemplary NSOM laser micro-machining system according to the present invention.

FIG. 1 illustrates a simplified block diagram of an exemplary NSOM laser micromachining system of the present invention. Quantum cellular automata, coupled quantum dot devices, resonant tunneling devices, multifunction optical arrays, diffractive optical elements, beam shapers, microlens arrays, optical diffusers, beam splitters, laser diode correctors, fine pitch gratings, photonic crystals, micro-electrical-mechanical systems, micro-circuitry, micro-surface-acoustic-wave devices, micro-mechanical oscillators, polymerase chain reaction microsystems, biochips for detection of hazardous chemical and biological agents, high-throughput drug screening and selection microsystems, and molds to form other microstructures are examples of microstructures that may be machined by an exemplary NSOM laser micromachining system of the present invention. These microstructures may be manufactured, repaired, or customized using such an exemplary system. This exemplary system includes ultrafast laser source 100, optical fiber 106, NSOM probe holder 108, and NSOM probe 110 to generate and transmit pulses of laser light to workpiece 112, as well as lens 104 to couple optical beam 102 into optical fiber 106 and numerous NSOM components to position NSOM probe 110.

It is specifically noted that an ultrafast laser source is used in the exemplary system of FIG. 1. Ultrafast laser sources may provide significantly higher peak power levels than longer pulsed laser source (i.e. lasers with pulse durations >1 ns) and CW laser sources. These high peak powers are desirable to help overcome the low efficiency with which the laser light is coupled through the probe tip into the near-field. Providing higher peak powers in NSOM probe 110 allows the use of even smaller NSOM probe tips compared to the wavelength of ultrafast laser source 100.

In non-near-field laser machining applications, the use of ultrafast lasers has been shown to significantly reduce the heat affected zone surrounding laser machined features, as disclosed in U.S. patent application Ser. No. 10/793,543 by M. Li entitled METHOD OF PRECISE LASER NANO-MACHINING WITH UV ULTRAFAST LASER PULSES, filed on Mar. 4, 2004. Reducing the heat affected zone may dramatically improve the quality of laser machined features. The same advantage may be obtained in the present invention by use of ultrafast laser source 100 as part of an NSOM laser micromachining system. Additionally, the increased peak power of ultrafast laser pulses means that higher amounts of power may be coupled through the probe tip of NSOM probe 110 into the near-filed mode portion. This higher amount of power in the near-field mode portion may allow each pulse of laser light to machine a greater depth of the workpiece material of microstructure workpiece 112.

In the exemplary system of FIG. 1, ultrafast laser source 100 may desirably include any type of solid state gain medium typically used for ultrafast laser machining applications, such as: Cr:YAG (peak fundamental wavelength, $\lambda_f$=1520 nm); Cr:Forsterite ($\lambda_f$=1230–1270 nm); Nd:YAG and Nd:YVO4 ($\lambda_f$=1064 nm); Nd:GdVO4 ($\lambda_f$=1063 nm); Nd:YLF ($\lambda_f$=1047 nm and 1053 nm); Nd:glass ($\lambda_f$=1047–1087 nm); Yb:YAG ($\lambda_f$=1030 nm); Cr:LiSAF ($\lambda_f$=826–876 nm); Ti:Sapphire ($\lambda_f$=760–820 nm); and Pr:YLF ($\lambda_f$=612 nm). These solid state gain media may be pumped using standard optical pumping systems such as erbium doped fiber lasers and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light. Ultrafast laser source 100 produces pulses of laser light, which have a duration of less than about 1ns. These pulses may desirably have durations of less than about 20ps, and in many cases their durations may be less than 200fs. The pulses of laser light produced by ultrafast laser source 100 may desirably be nearly Fourier-transform limited. An additional, non-solid state, single or multiple pass amplifier such as a XeCl, KrF, ArF, or $F_2$ excimer amplifier (not shown) may be included to increase the output power of ultrafast laser source 100. Alternatively, ultrafast laser source 100 may include an ultrafast excimer laser system (e.g. XeCl, $\lambda_f$=308 nm; KrF, $\lambda_f$=248 nm; ArF, $\lambda_f$=193 nm; or $F_2$, $\lambda_f$=157 nm) or an ultrafast dye laser system (e.g. 7-diethylamino-4-methylcoumarin, $\lambda_f$=435–500 nm; benzoic acid, 2-[6-(ethylamino)-3-(ethylimino)-2,7-dimethyl-3H-xanthen-9-yl]-ethyl ester, monohydrochloride, $\lambda_f$=555–625 nm; 4-dicyanmethylene-2-methyl-6-(p-dimethylaminostyryl)-4H -pyran, $\lambda_f$=598–710 nm; or 2-(6-(4-dimethylaminophenyl)-2,4-neopentylene-1, 3,5-hexatrienyl)-3-methylbenzothiazolium perchlorate, $\lambda_f$=785–900 nm).

It may be desirable for ultrafast laser source 100 to have a peak wavelength of less than approximately 400 nm. A harmonic generation crystal may be used within this component to reduce the peak wavelength of the pulses of laser light. Desirably, a frequency-doubled, 150fs Ti:Sapphire laser (for example a Clark MXR CPA2000) may be used as ultrafast laser source 100.

Additionally, ultrafast laser source 100 may include optics to control the intensity, polarization, and/or collimation of its laser beam output. A polarization controller may be included to control the polarization of the pulses of laser light generated by the ultrafast laser source 100. These pulses may be desirably circularly polarized. A shutter and/or a variable attenuator may be included in ultrafast laser source 100. These components may be coupled to control circuitry of the NSOM (not shown) to control laser machining of features on the surface of microstructure workpiece 112.

The output of laser source 100 may be focused by lens 104 into optical fiber 106, which desirably has a fiber core formed of a waveguide material that has low absorptivity near the peak wavelength of the pulses of laser light. Optical fiber 106 may be a part of NSOM probe 110 and the cleaved end of optical fiber 106 may function as the input plane of NSOM probe 110. This may be desirable to reduce coupling losses in the system. NSOM probe 110, including its optical fiber portion 106, is held in NSOM probe holder 108.

Alternatively, optical fiber 106 may be separate from NSOM probe 110. In this alternative embodiment, NSOM probe 110 may only extend from the probe tip into NSOM probe holder 108. Optical fiber 106 transmits the pulses of laser light to the NSOM probe 110 through an input plane at the end of NSOM probe 110. Both optical fiber 106 and NSOM probe 110 are held in NSOM probe holder 108. Optical fiber 106 and NSOM probe 110 are aligned to allow for low loss coupling of the pulses of laser light into the NSOM probe. The input plane of NSOM probe 110 is desirably a cleaved fiber end and has an input area approximately equal to a cross-sectional area of the cleaved end of optical fiber 106. NSOM probe holder 108 may include optics, such as a ball lens to assist in optically coupling optical fiber 106 and NSOM probe 110. It is noted that pulses of optical beam 102 may alternatively be coupled directly into NSOM probe 110 without the use of optical fiber 106 to reduce dispersion effects, but this may complicate alignment of the system.

NSOM probe 110 is formed in a substantially cylindrical shape. It is noted that, although a cross-sectional shape of this substantially cylindrical shape may desirably be similar to optical fiber 106 near the end of NSOM probe 110 that acts as the input plane, this is not necessary. The cross-sectional shape of NSOM probe 110 may desirably be circular or another elliptical shape, or alternatively may be another shape used for waveguides, such as rectangular, and may change in size or shape along its length. For example, the substantially cylindrical shape of NSOM probe 110 tapers near its tip end to produce the probe tip. Additionally, it is contemplated that the substantially cylindrical shape of NSOM probe 110 may include a bend along its axis, as shown in FIG. 1.

Figure 3:
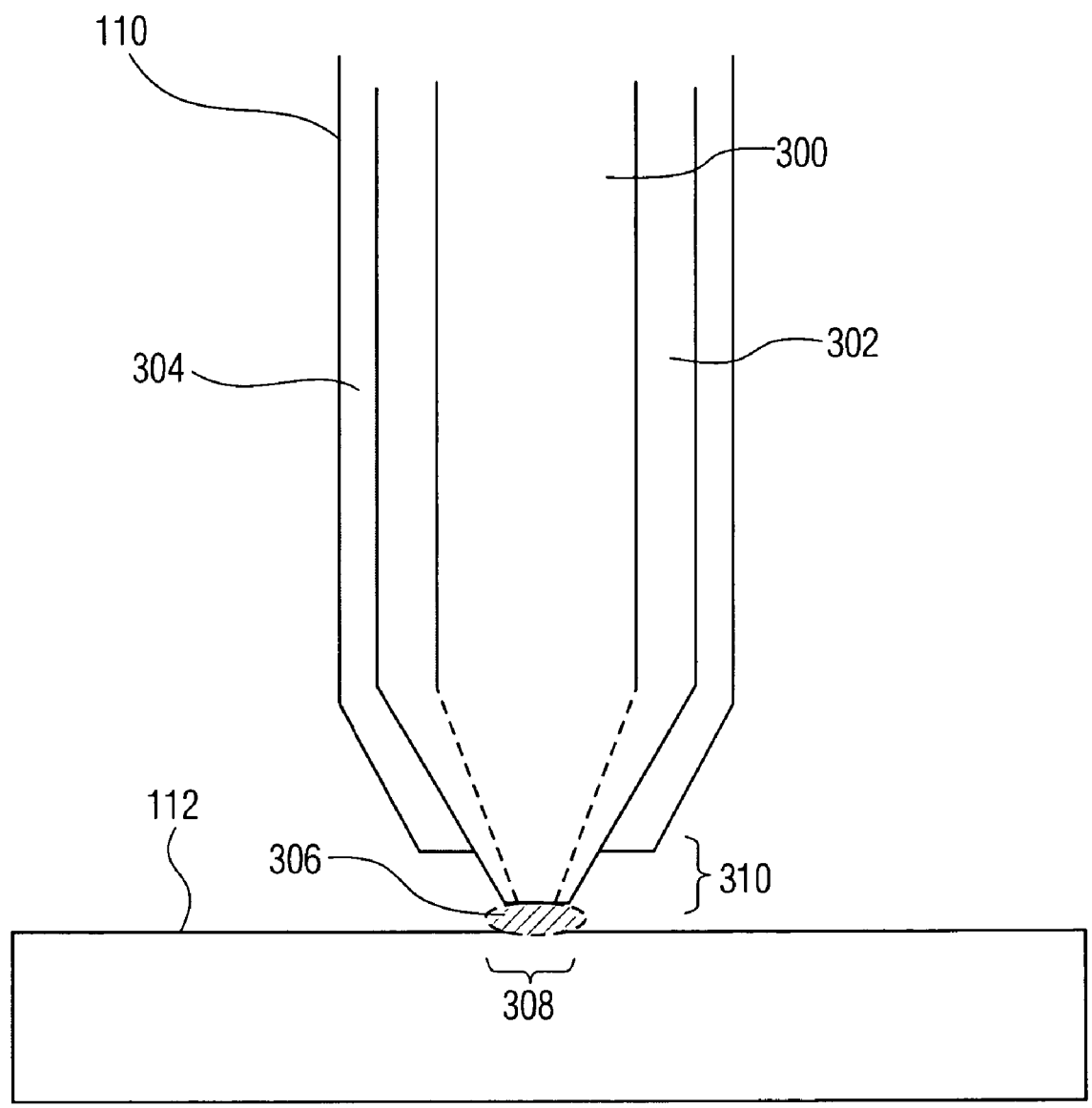
FIG. 3 is a side cut-away drawing of an exemplary NSOM probe according to the present invention cut along a diameter of the exemplary NSOM probe.

FIG. 3 illustrates a close view of the tip end of exemplary NSOM probe 110. The end of the NSOM probe including the input plane is not shown in FIG. 3. Probe tip 310, which is located at the other end of NSOM probe 110 from the input plane, is shown. NSOM probe 110 includes a portion of optically transmissive core 300 and may also include a portion of cladding layer 302, as shown. In probe tip 310 the materials of optically transmissive core 300 and cladding layer 302 may be indistinguishable, illustrated by the dashed lines separating these materials in the tip region of the exemplary tip in FIG. 3. NSOM probe tip 310, from which near-field 306 emanates, may desirably have cross-sectional area of less than a square of the peak wavelength of the pulses of laser light and an elliptical cross-sectional shape, which allows machining of similar elliptical shapes with axes shorter than the peak wavelength in near-field irradiated area 308 of microstructure workpiece 112.

Optically transmissive core 300 desirably extends from the input plane to probe tip 310 and is optically coupled to ultrafast laser source 100 through optical fiber 106 at the input plane. As with the fiber core of optical fiber 106, optically transmissive core 300 of NSOM probe 110 is formed of a material that has low absorptivity near the peak wavelength of the pulses of laser light and may desirably be formed of the same waveguide material. Cladding layer 302 desirably extends from the input plane to probe tip 310 to help confine the pulses of laser light within transmissive core 300, but may be omitted if sufficient confinement may occur without it.

Figure 4:
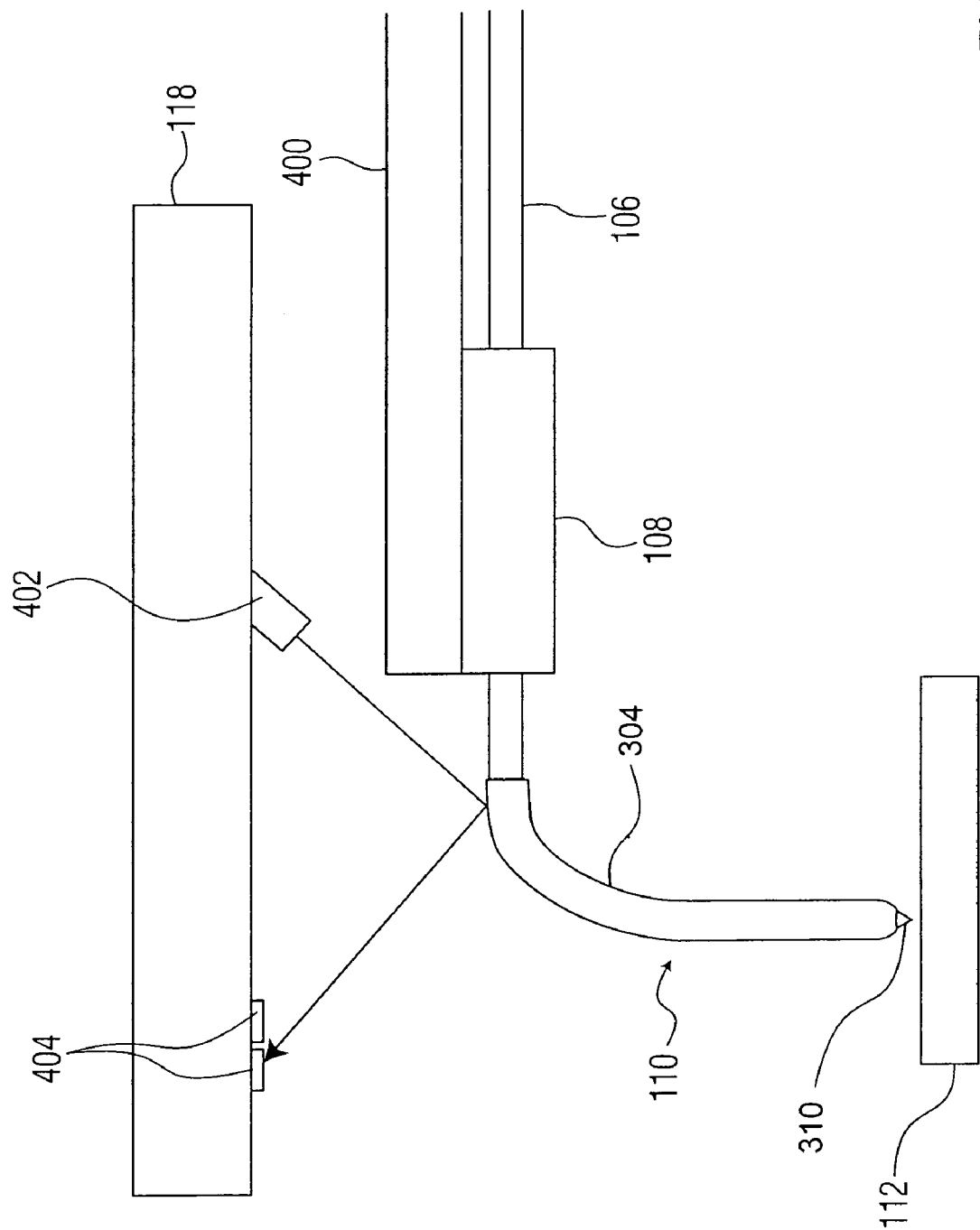
FIG. 4 is a side plan drawing of an exemplary NSOM probe, probe holder, and probe position monitor configuration according to the present invention.

Radiation confinement coating 304 is also formed on NSOM probe 110 and extends from adjacent to probe tip 310 along the side surface of the probe. Radiation confinement coating 304 provides additional confinement of the pulses of laser light in optically transmissive core 300 in sections of NSOM probe 110 that may otherwise be particularly leaky, such as the narrow section near probe tip 310 and any sections with a tight radius of curvature. Additionally, radiation confinement coating 304 substantially defines the area of probe tip 310, by its absence. It may extend as far as or to an opening adjacent to the input plane or may only extend a portion of that distance. In an exemplary embodiment in which the NSOM probe has a 90° bend it is desirable for radiation confinement coating 304 to extend at least around the bend, as shown in FIG. 4. Radiation confinement coating 304 has high reflectivity near the peak wavelength of the pulses of laser light and desirably has low absorptivity in this band as well. It may include at least one metal and/or dielectric layer. It is further noted, as shown in FIG. 4, that it may be desire for radiation confinement coating 304 to be substantially reflective to light that may be used for optically monitoring the position of NSOM probe 110.

Returning to FIG. 1, NSOM probe holder 108 is coupled to an NSOM mount to controllably hold and position NSOM probe 110. The NSOM mount also controllably holds and positions microstructure workpiece 112 relative to NSOM probe 110. The NSOM mount includes top support 118 which is connected to NSOM base 114 by hinge 120. This configuration allows NSOM probe 110 to be easily lifted away from microstructure workpiece 112 to allow inspection and/or replacement of the probe or mounting and dismounting of workpieces. Gross vertical, or Z, positioning of NSOM probe 110 over microstructure workpiece 112 may be accomplished using set screw 122 which may be coupled to a lead screw (not shown) or a stepper motor (not shown). The exemplary NSOM mount of FIG. 1 also includes workpiece positioning section 116 on which microstructure workpiece 112 is mounted. Workpiece positioning means 116 is coupled to NSOM base 114. It is noted that, although the exemplary embodiment of FIG. 1 includes workpiece positioning means 116 for positioning microstructure workpiece 112 relative to NSOM probe 110, one skilled in the art may understand that a positioning means to position NSOM probe 110 relative to microstructure workpiece 112 may be used in addition to, or in place of, workpiece positioning means 116.

Workpiece positioning means 116 may include, for example, a computer-controlled XYZ motion stage with micrometer resolution (for example, a micron resolution XYZ motion stage manufactured by Burleigh). A computer-controlled, piezo-electric XY motion stage with nanometer-resolution (for example, a piezo-electric XY motion stage manufactured by Queensgate) may also be included. Fine Z positioning may be accomplished using a piezo-electric Z motion stage in workpiece positioning means 116. These computer-controlled motion stages of workpiece positioning means 116 may be used to position the NSOM of the laser micro-machining system over the surface of microstructure workpiece 112, with the micrometer resolution XYZ motion stage providing coarse positioning and the piezo-electric motion stages providing fine positioning. Alternatively, other fine motion stages capable of nanometer resolution may be used to provide fine positioning.

Figure 5:
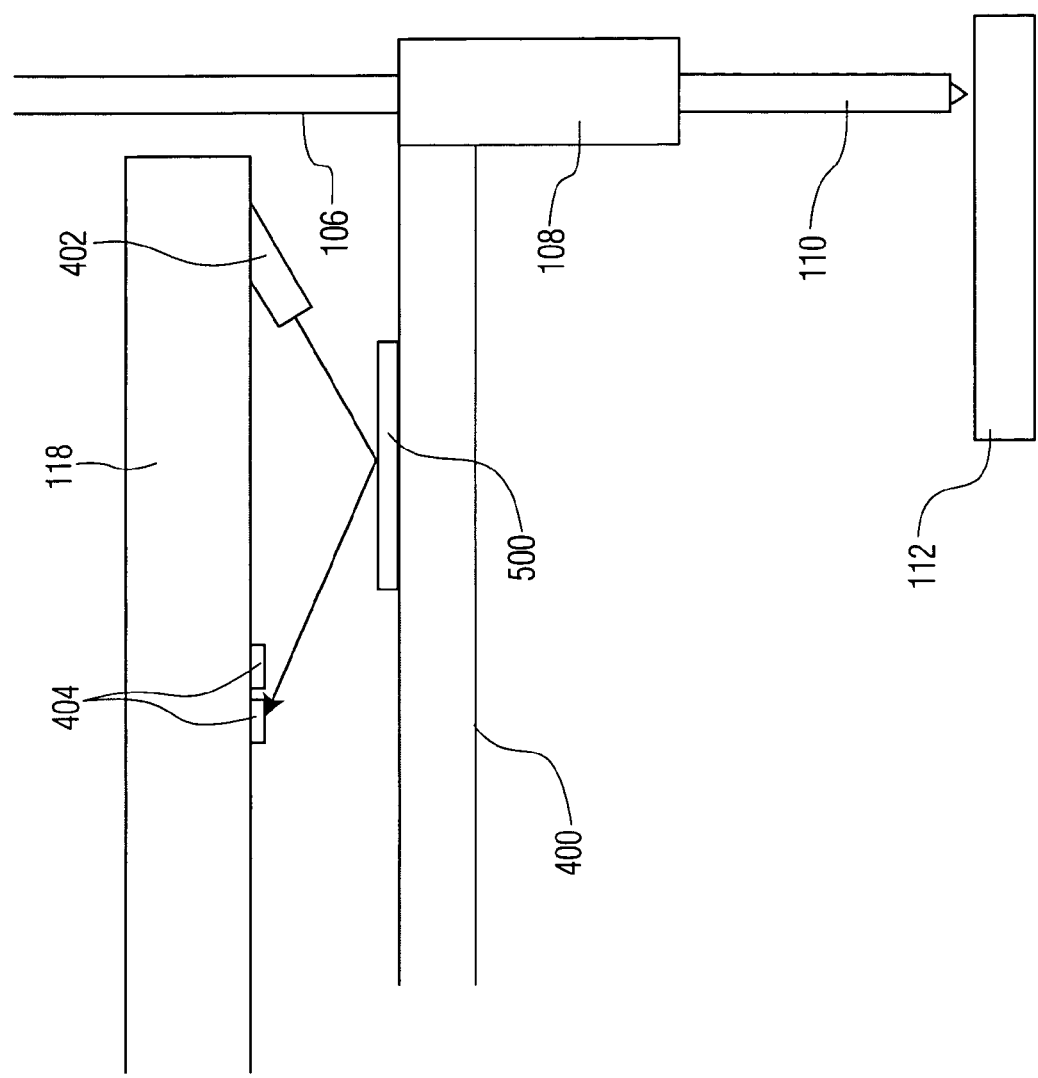
FIG. 5 is a side plan drawing of an alternative exemplary NSOM probe, probe holder, and probe position monitor configuration according to the present invention.

An exemplary NSOM laser micromachining system of the present invention also includes an NSOM control system. Exemplary NSOM control systems according to the present invention are illustrated in FIGS. 4 and 5. These exemplary NSOM control systems include NSOM probe monitors and NSOM controllers, which are coupled to the NSOM probe monitor, the piezo-electric XY motion stage, and the piezo-electric Z motion stage. The NSOM probe monitor determines the distance between probe tip 310 of the NSOM probe 110 and the surface of the microstructure workpiece 112.

The NSOM controller (not shown) uses this distance information to control the vertical position of either NSOM probe 110 or microstructure workpiece 112 (or both) by sending a signal to the Z motion stage(s), depending on which is coupled to the positioning means. The NSOM controller also controls the horizontal position of either NSOM probe 110 or microstructure workpiece 112 by sending a signal to the XY motion stage(s) based on the feature to be laser machined on the surface of microstructure workpiece 112. The NSOM controller may include circuitry or an ASIC, and may include a general purpose computer programmed to drive the motion stages in response to distance information from the NSOM probe monitor and input data regarding the feature to be machined on the surface of the microstructure workpiece.

FIGS. 4 and 5 illustrate two exemplary NSOM probe monitors based on optical means of making atomic force measurements. The exemplary embodiment of FIG. 4 includes an NSOM probe with a 90° bend and the exemplary embodiment of FIG. 5 includes a straight NSOM probe. These alternative embodiments of NSOM probe 110 are merely illustrative and not limiting.

Each of the exemplary NSOM probe monitors in FIG. 4 and 5 uses cantilevered arm 400 to couple NSOM probe holder 108 to NSOM top support 118. NSOM top support 118 is substantially rigid, while cantilevered arm 400 may move a calibrated amount relative to NSOM top support 118 in a direction substantially normal to the surface of microstructure workpiece 112. This calibrated movement may result from flexing of cantilevered arm 400 or may be due to pivoting of cantilevered arm 400 on the coupling (not shown) between cantilevered arm 400 and NSOM top support 118 in response to atomic force between probe tip 310 and the surface of microstructure workpiece 112. Alternatively, NSOM probe 110 may be periodically oscillated by an NSOM probe oscillator coupled to cantilevered arm 400. The amplitude of this periodic oscillation of NSOM probe 110 is desirably small, in the range of 0 to 20 nm. Changes in one, or both, of the period or amplitude of this periodic oscillation of NSOM probe 110 may provide the calibrated movement for the probe monitor.

The exemplary NSOM probe monitor of FIG. 4 involves an optical sensing method in which light is reflected directly off of radiation confinement coating 304. Light source 402 is coupled to substantially rigid top support 118 as is an optical detector that includes at least two optical regions 404. Light source 402 produces a substantially collimated beam of light. This substantially collimated beam of light is reflected off of radiation confinement coating 304 and is then detected by the optical detector. As NSOM probe 110 moves up and down in response to atomic force between probe tip 310 and the surface of microstructure preform 112, cantilevered arm 400 either flexes or pivots, changing the angle of incidence between the substantially collimated beam of light from light source 402 and radiation confinement coating 304. This changes the location at which the substantially collimated beam of light is incident of the optical detector. Cantilever flexing may also change the point of incidence which may further change the location at which the substantially collimated beam of light is incident of the optical detector. Additionally, possible flexing of NSOM probe 110 due to atomic force may be detected as well. The multiple detector regions 404 allow the optical detector to generate a signal based on an amount of light detected by each detector region. Processing means in the NSOM controller receive this detector signal and may determine the distance between the probe tip of the NSOM probe and the surface of the microstructure workpiece based on the amount of light detected by each detector region 404 of the optical detector. This distance determination by the processing means may involve determining and indicating that the distance between the probe tip of the NSOM probe and the surface of the microstructure workpiece is greater than or less than a desired distance, or may alternatively provide a calibrated distance reading.

The exemplary NSOM probe monitor of FIG. 5 uses an alternative optical sensing method in which light is reflected off of reflective planar surface 500 that is coupled to cantilevered arm 400. The substantially collimated beam of light from light source 402 is reflected off of reflective planar surface 500 and is then detected by the optical detector, changing the location at which the substantially collimated beam of light is incident of the optical detector. The atomic force on NSOM probe 110, and, thus, the distance between the probe tip of the NSOM probe and the surface of the microstructure workpiece may then be determined from the detector signal of the optical signal, as in the exemplary embodiment of FIG. 4.

Alternatively, the exemplary NSOM probe monitor may be based another means of detecting the atomic force on the NSOM probe. Any means that is used in atomic force microscopes may be used in the present invention. For example, a tuning fork method may be used in which the resonance frequencies of a matched pair of tuning forks are compared. One tuning fork is coupled to the NSOM probe so that forces on the probe may affect the resonance frequency of the tuning fork. Differences in the resonance frequencies of the tuning forks may then be correlated to atomic force on the NSOM probe.

Figure 2:
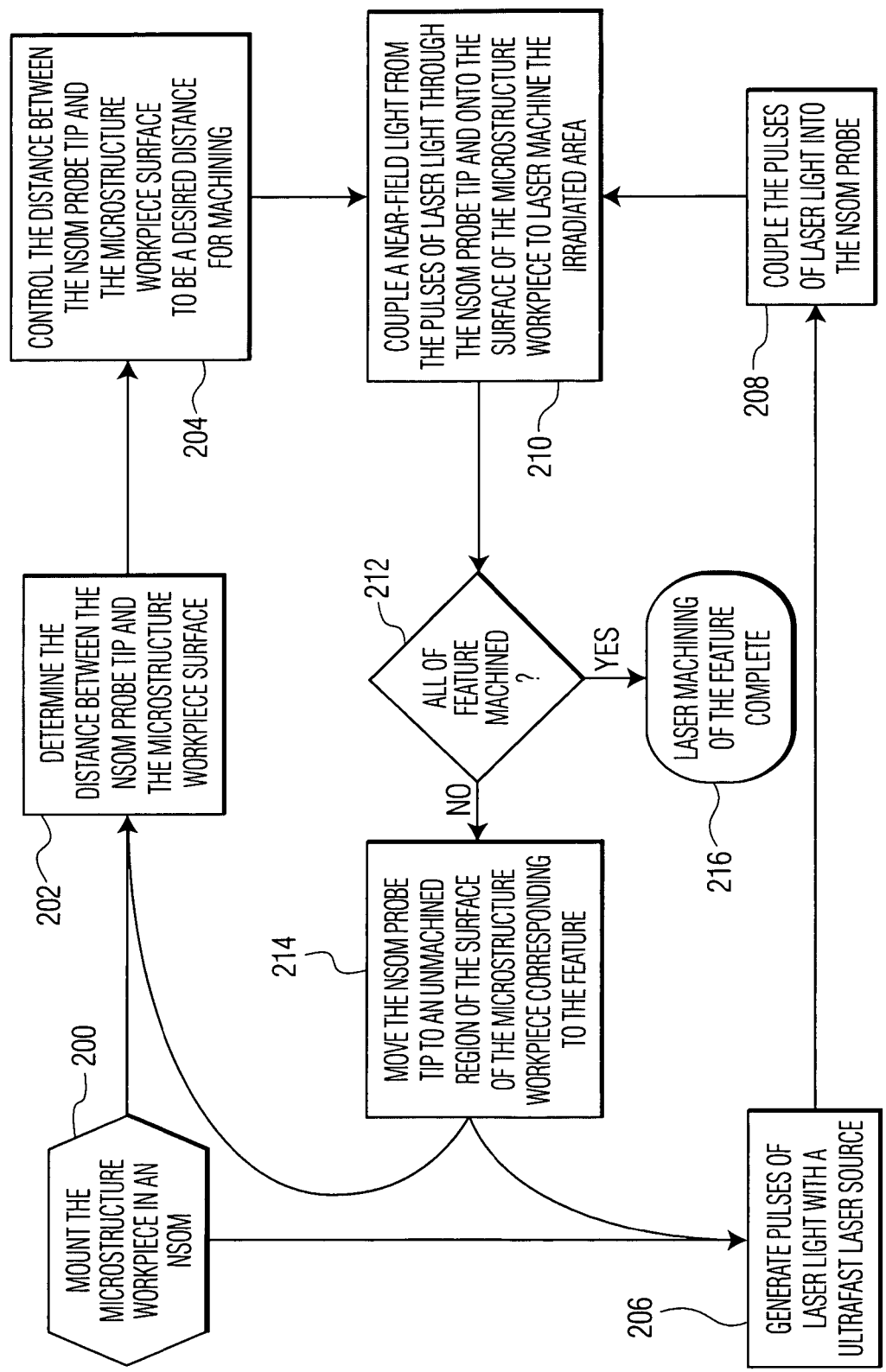
FIG. 2 is a flow chart illustrating an exemplary method of laser machining a feature of a microstructure according to the present invention.

FIG. 2 illustrates an exemplary method for laser machining a feature on a microstructure workpiece using an ultrafast laser source and an NSOM according to the present invention. The exemplary NSOM laser micromachining system of FIG. 1 may be used to perform this exemplary method. Microstructure workpiece 112 is mounted in the NSOM, step 200. The distance between probe tip 310 of NSOM probe 110 and a surface of microstructure workpiece 112 is determined, step 202. This distance may desirably be determined by detecting the atomic force between probe tip 310 and the surface as described above with reference to the exemplary embodiments of FIGS. 4 and 5.

The distance between probe tip 310 and the surface of the microstructure workpiece 112 is then controlled to be substantially equal to a desired machining distance, step 204. The desired machining distance is based on a number of factors including the peak power of the pulses of laser light, their peak wavelength, the size of probe tip 310, and the type of machining to be accomplished, but is desirably in the range of up to about half of the wavelength of the pulses of light used for machining the surface. The distance between probe tip 310 of NSOM probe 110 and the surface of the microstructure workpiece 112 is desirably controlled using a piezo-electric, or other fine motion, Z motion stage to control a vertical position of either the NSOM probe or the microstructure workpiece. The amount of drive voltage applied to the motion stage is based on the distance between probe tip 310 and the surface of microstructure workpiece 112 determined in step 202. It is desirable that the distance between probe tip 310 and the surface of microstructure workpiece 112 be controlled with a tolerance of less than 5 nm.

As the NSOM is positioning the probe tip in steps 202 and 204, ultrafast laser source 100 is used to generate pulses of laser light having pulse durations less than about 1 ns, step 206. A harmonic generating crystal may be used to produce pulses of laser light having a shorter peak wavelength from the initial pulses of laser light generated by ultrafast laser source 100. Additionally, an attenuator may be included in laser source 100 to control the fluence of the pulses of laser light, producing pulses of laser light having a predetermined near-field machining fluence. A polarization controller adjusts the polarization of the pulses to be substantially circular. The resulting pulses of laser light are coupled into NSOM probe 110, step 208.

As shown in FIG. 3, once the distance between probe tip 310 and the surface of microstructure workpiece 112 has been set to the desired machining distance in step 204 and the pulses of laser light are coupled into NSOM probe 110 in step 208, a near-field mode portion 306 of these pulses of laser light is transmitted through probe tip 310 of the NSOM probe and is evanescently coupled onto near-field irradiated area 308 of the surface of microstructure workpiece 112, step 210. This causes near-field irradiated area 308 to be laser machined by near-field mode portion 306. Near-field irradiated area 308 desirably mimics the shape and size of probe tip 310 and corresponds to the horizontal location of probe tip 310. As described above with regard to FIG. 3, probe tip 310 desirably has an elliptical cross-sectional shape and a tip area less than a square of the peak wavelength of the pulses of laser light. Laser machining of near-field irradiated area 308 in step 210 includes: ablating workpiece material of the microstructure workpiece in the near-field irradiated area; laser-assisted chemical vapor depositing deposition material on the surface of the microstructure workpiece in the near-field irradiated area; exposing photoresist on the surface of the microstructure workpiece in the near-field irradiated area; changing an index of refraction of workpiece material of the microstructure workpiece in the near-field irradiated area; altering a lattice structure of workpiece material of the microstructure workpiece in the near-field irradiated area; and changing a chemical composition of workpiece material of the microstructure workpiece in the near-field irradiated area.

It is determined whether all of the feature to be machined has been machined, step 212. If the all of the feature has been machined, then the laser machining of the feature is complete, step 216, and the microstructure workpiece may be removed from the NSOM. If not, then probe tip 310 is moved to an unmachined portion of the surface of microstructure workpiece 112 which corresponds to a portion of the feature, step 214. This may be done by moving either NSOM probe 110 or microstructure workpiece 112.

The exemplary method loops back through steps 202 and 204 to maintain the distance between probe tip 310 and the surface substantially equal to the machining distance and through steps 206, 208, 210, and 212 to laser machine the corresponding portion of the feature at each new position of probe tip 310. Thus, the movement scans the probe tip over the entire feature region of the surface of the microstructure workpiece corresponding to the feature.

If ultrafast laser source 100 includes an ultrafast laser oscillator to generate the pulses of laser light and a shutter to control emission of the pulses, then probe tip 310 may be scanned over a larger portion of the surface of microstructure workpiece 112 that includes the feature region. The shutter may be opened when probe tip 310 is being scanned over the feature region, thereby allowing laser machining of the feature, and closed when the probe tip is being scanned over other regions of the surface, thereby preventing unwanted laser machining of these other scanned regions of the surface of microstructure workpiece 112.

The present invention includes an exemplary system and exemplary methods to laser machine surfaces of a microstructure workpiece using near field radiation. The use of these exemplary methods allows greatly simplified, yet highly accurate, micro-machining in ambient atmosphere conditions. Such techniques may help to bring microstructures and nanotechnology into more common use. Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A near-field scanning optical microscope (NSOM) for laser machining a feature on a surface of a microstructure workpiece using an ultrafast laser source, the NSOM comprising:
    the ultrafast laser source to generate pulses of laser light having pulse durations less than 1 ns and a peak wavelength;
    an NSOM probe having a substantially cylindrical shape, the NSOM probe including:
        an input plane at one end of the NSOM probe;
        a probe tip at another end of the NSOM probe with a cross-sectional area less than a square of the peak wavelength of the pulses of laser light;
        an optically transmissive core extending substantially from the input plane to the probe tip, the optically transmissive core portion being optically coupled to the ultrafast laser source through the input plane; and
        a radiation confinement coating formed on a section of a side surface of the NSOM probe adjacent to the probe tip;
    an NSOM mount to controllably hold the NSOM probe and the microstructure workpiece, the NSOM mount including;
        an XY motion stage coupled to one of the NSOM probe or the microstructure workpiece; and
        a Z motion stage coupled to one of the NSOM probe or the microstructure workpiece;
    an NSOM probe monitor coupled to the NSOM mount for determining a distance between the probe tip of the NSOM probe and the surface of the microstructure workpiece;
    an NSOM controller coupled to the NSOM probe monitor, the XY motion stage, and the Z motion stage, the NSOM controller controlling;
        a vertical position of the one of the NSOM probe or the microstructure workpiece coupled to the Z motion stage based on the distance between the probe tip of the NSOM probe and the surface of the microstructure workpiece determined by the NSOM probe monitor; and
        a horizontal position of the one of the NSOM probe or the microstructure workpiece coupled to the XY motion stage based on the feature to be laser machined on the surface of the microstructure workpiece.

2. The NSOM according to claim 1, further comprising:
    an optical fiber optically coupled to the ultrafast laser source to transmit the pulses of laser light to the NSOM probe;
    wherein the input plane of the NSOM probe has an input area approximately equal to a cross-sectional area of the optical fiber.

3. The NSOM according to claim 2, wherein:
    the optical fiber has a fiber core that is formed of a waveguide material that has low absorptivity near the peak wavelength of the pulses of laser light.

4. The NSOM according to claim 1, wherein the ultrafast laser source includes at least one of:

a harmonic generating crystal to reduce the peak wavelength of the pulses of laser light;
a shutter coupled to the NSOM controller to control laser machining of the feature;
an attenuator coupled to the NSOM controller to control laser machining of the feature; or
a polarization controller for controlling a polarization of the pulses of laser light generated by the ultrafast laser source to be circularly polarized.

5. The NSOM according to claim 1, wherein the peak wavelength of the pulses of laser light is less than about 400 nm.

6. The NSOM according to claim 1, wherein the pulse duration of the pulses of laser light is less than about 20 ps.

7. The NSOM according to claim 1, wherein the probe tip of the NSOM probe has an elliptical cross-sectional shape.

8. The NSOM according to claim 1, wherein the optically transmissive core of the NSOM probe is formed of a waveguide material that has low absorptivity near the peak wavelength of the pulses of laser light.

9. The NSOM according to claim 1, wherein the radiation confinement coating has low absorptivity and high reflectivity near the peak wavelength of the pulses of laser light.

10. The NSOM according to claim 1, wherein the radiation confinement coating is formed of at least one of a metal layer or a dielectric layer.

11. The NSOM according to claim 1,
wherein the NSOM probe forms a substantially 90° bend between the input plane and the probe tip;
whereby a propagation direction of the pulses of laser light in the optically transmissive core of the NSOM probe is substantially bent 90° between the input plane and the probe tip.

12. The NSOM according to claim 11, wherein the section of the side surface of the NSOM probe coated by the radiation confinement coating extends from adjacent to the probe tip to at least the substantially 90° bend.

13. The NSOM according to claim 1, wherein:
the XY motion stage is a piezo-electric XY motion stage; and
the Z motion stage is a piezo-electric Z motion stage.

14. The NSOM according to claim 1, wherein:
the NSOM mount further includes a cantilevered NSOM probe holder adapted to allow calibrated movement of the NSOM probe in response to atomic force between the probe tip of the NSOM probe and the surface of the microstructure workpiece; and
the NSOM probe monitor determines the distance between the probe tip of the NSOM probe and the surface of the microstructure workpiece based on the calibrated movement of the NSOM probe.

15. The NSOM according to claim 14, wherein:
the NSOM mount further includes an NSOM probe oscillator coupled to the cantilevered NSOM probe holder to generate a periodic oscillation of the NSOM probe in a direction substantially normal to the surface of the microstructure workpiece; and
the calibrated movement of the NSOM probe in response to atomic force between the probe tip of the NSOM probe and the surface of the microstructure workpiece is a change in at least one of;
a period of the periodic oscillation of the NSOM probe; or
an amplitude of the periodic oscillation of the NSOM probe.

16. The NSOM according to claim 15, wherein:
the amplitude of the periodic oscillation of the NSOM probe is in the range of 0 to 20 nm.

17. The NSOM according to claim 14, wherein:
the NSOM probe monitor includes:
a light source to produce a substantially collimated beam of light;
a reflective planar surface coupled to one of the NSOM probe and the cantilevered NSOM probe holder to reflect the substantially collimated beam of light;
an optical detector having at least two detector regions to detect the reflected substantially collimated beam of light and generate signal based on an amount of light detected by each detector region; and
processing means to determine the distance between the probe tip of the NSOM probe and the surface of the microstructure workpiece based on signals generated by the optical detector.

18. The NSOM according to claim 1, wherein the NSOM probe monitor includes a force meter coupled between;
the NSOM mount; and
one of the NSOM probe or the microstructure workpiece.

19. A method for laser machining a feature on a microstructure workpiece using an ultrafast laser source and a near-field scanning optical microscope (NSOM), the method comprising the steps of:
a) mounting the microstructure workpiece in the NSOM;
b) determining a distance between a probe tip of an NSOM probe of the NSOM and a surface of the microstructure workpiece;
c) controlling the distance between the probe tip and the surface of the microstructure workpiece such that the distance is substantially equal to a machining distance;
d) using the ultrafast laser source to generate pulses of laser light having pulse durations less than 1 ns and a peak wavelength;
e) coupling the pulses of laser light into the NSOM probe;
f) coupling a near-field mode portion of the pulses of laser light through the probe tip of the NSOM probe and onto a near-field irradiated area of the surface of the microstructure workpiece corresponding to a location of the probe tip to laser machine the near-field irradiated area;
g) moving at least one of the NSOM probe or the microstructure workpiece such that the probe tip is scanned over a feature region of the surface of the microstructure workpiece corresponding to the feature while
repeating steps (b) and (c) to maintain the distance between the probe tip and the surface substantially equal to the machining distance; and
repeating steps (d), (e), and (f) to laser machine the feature on the surface of the microstructure workpiece.

20. The method according to claim 19, wherein the step of determining the distance between the probe tip of the NSOM probe and the surface of the microstructure workpiece includes detecting an atomic force between the probe tip and the surface.

21. The method according to claim 19, wherein the step of determining the distance between the probe tip of the NSOM probe and the surface of the microstructure workpiece includes:
b1) generating a periodic oscillation of the NSOM probe in a direction substantially normal to the surface of the microstructure workpiece;
b2) detecting at least one of;
a period of the periodic oscillation of the NSOM probe; or
an amplitude of the periodic oscillation of the NSOM probe; and b3) determining the distance between the probe and the surface based on changes in the at least one of the period or the amplitude of the periodic oscillation.

22. The method according to claim 19, wherein the step of controlling the distance between the probe tip of the NSOM probe and the surface of the microstructure workpiece includes using a Z motion stage to control a vertical position of one of the NSOM probe or the microstructure workpiece based on the distance between the probe tip of the NSOM probe and the surface of the microstructure workpiece determined in step (b).

23. The method according to claim 19, wherein:
the machining distance is in the range of up to about half of the peak wavelength of the pulses of laser light; and
the distance between the probe tip of the NSOM probe and the surface of the microstructure workpiece is controlled in step (c) with a tolerance of less than 5 nm.

24. The method according to claim 19, wherein:
the ultrafast laser source includes an ultrafast laser oscillator and an attenuator; and
step (d) includes the steps of:
    d1) using the ultrafast laser oscillator to generate initial pulses of laser light having pulse durations less than 1 ns, the peak wavelength, and an initial fluence; and
    d2) using the attenuator to control the fluence of the initial pulses of laser light, thereby producing the pulses of laser light having a predetermined near-field machining fluence.

25. The method according to claim 19, wherein:
the ultrafast laser source includes an ultrafast laser oscillator and a polarization controller; and
step (d) includes the steps of:
    d1) using the ultrafast laser oscillator to generate initial pulses of laser light having pulse durations less than 1 ns, the peak wavelength, and an initial polarization; and
    d2) using the polarization controller to adjust the initial polarization of the initial pulses of laser light to a substantially circular polarization, thereby producing the pulses of laser light.

26. The method according to claim 19, wherein:
the probe tip of the NSOM probe has an elliptical cross-sectional shape; and
step (f) includes;
    f1) transmitting the near-field mode portion of the pulses of light through the probe tip of the NSOM probe;
    f2) evanescently coupling the near-field mode portion of the pulses of light onto the near-field irradiated area of the surface of the microstructure workpiece, the near-field irradiated area having substantially the same elliptical cross-sectional shape as the probe tip.

27. The method according to claim 19, wherein:
the probe tip of the NSOM probe has a tip area less that a square of the peak wavelength; and
step (f) includes;
    f1) transmitting the near-field mode portion of the pulses of light through the probe tip of the NSOM probe;
    f2) evanescently coupling the near-field mode portion of the pulses of light onto the near-field irradiated area of the surface of the microstructure workpiece, the near-field irradiated area being substantially equal to the tip area of the probe tip.

28. The method according to claim 19, wherein laser machining the near-field irradiated area in step (f) includes at least one of:
ablating workpiece material of the microstructure workpiece in the near-field irradiated area;
laser-assisted chemical vapor depositing deposition material on the surface of the microstructure workpiece in the near-field irradiated area;
exposing photoresist on the surface of the microstructure workpiece in the near-field irradiated area;
changing an index of refraction of workpiece material of the microstructure workpiece in the near-field irradiated area;
altering a lattice structure of workpiece material of the microstructure workpiece in the near-field irradiated area; or
changing a chemical composition of workpiece material of the microstructure workpiece in the near-field irradiated area.

29. The method according to claim 19, wherein:
the ultrafast laser source includes an ultrafast laser oscillator to generate the pulses of laser light in step (d) and a shutter to control emission of the pulses; and
step (g) includes the steps of:
    g1) moving the at least one of the NSOM probe or the microstructure workpiece to scan the probe tip over a portion of the surface of the microstructure workpiece including the feature region;
    g2) opening the shutter when the probe tip is scanned over the feature region of the surface of the microstructure workpiece, thereby allowing laser machining of the feature; and
    g3) closing the shutter when the probe tip is scanned over other scanned regions of the surface of the microstructure workpiece, thereby preventing laser machining of the other scanned regions of the surface of the microstructure workpiece.

* * * * *